United States Patent
Li

(10) Patent No.: US 9,405,377 B2
(45) Date of Patent: Aug. 2, 2016

(54) TRAINABLE SENSOR-BASED GESTURE RECOGNITION

(71) Applicant: Microsoft Corporation, Redmond, WA (US)

(72) Inventor: MengKe Li, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 14/214,707

(22) Filed: Mar. 15, 2014

(65) Prior Publication Data

US 2015/0261298 A1  Sep. 17, 2015

(51) Int. Cl.
G09G 5/00 (2006.01)
G06F 3/01 (2006.01)
G01P 15/00 (2006.01)
G01H 17/00 (2006.01)

(52) U.S. Cl.
CPC ............... *G06F 3/017* (2013.01); *G01H 17/00* (2013.01); *G01P 15/00* (2013.01)

(58) Field of Classification Search
CPC ......... G06F 3/016; G06F 3/011; G06F 3/038; G06F 3/03333; G06F 3/03313
USPC .......................... 345/156–158, 173–179, 204
See application file for complete search history.

(56) References Cited

U.S. PATENT DOCUMENTS

| | | | |
|---|---|---|---|
| 8,187,182 B2 | 5/2012 | Kahn | |
| 8,253,684 B1 | 8/2012 | Lloyd | |
| 8,429,103 B1 | 4/2013 | Aradhye | |
| 2009/0051648 A1 | 2/2009 | Shamaie et al. | |
| 2010/0064261 A1* | 3/2010 | Andrews | G06F 3/04883 715/863 |
| 2012/0265716 A1 | 10/2012 | Hunzinger | |
| 2012/0306770 A1 | 12/2012 | Moore | |
| 2013/0132566 A1 | 5/2013 | Olsen | |
| 2013/0173513 A1 | 7/2013 | Chu | |
| 2013/0191908 A1 | 7/2013 | Klein | |
| 2013/0328763 A1 | 12/2013 | Latta et al. | |
| 2014/0092031 A1* | 4/2014 | Schwartz | G06F 1/3206 345/173 |
| 2014/0337651 A1* | 11/2014 | Ye | G06F 1/3243 713/323 |
| 2015/0046886 A1* | 2/2015 | Goel | G06K 9/00 715/863 |

OTHER PUBLICATIONS

"International Search Report & Written Opinion Issued in PCT Patent Application No. PCT/US2015/020048", Mailed Date: Jun. 3, 2015, 10 Pages.

Azam, et al., "Human Behaviour Analysis Using Data Collected from Mobile Devices", Published Date: Jun. 30, 2012, pp. 10, Proceedings: In International Journal on Advances in Life Sciences, vol. 4, Issue 1 & 2, http://www.thinkmind.org/download.php?articleid=lifsci_v4_n12_2012_1.

* cited by examiner

*Primary Examiner* — Kimnhung Nguyen

(74) *Attorney, Agent, or Firm* — Dave Ream; Tom Wong; Micky Minhas

(57) ABSTRACT

In many computing scenarios, a device comprises at least one sensor, and is configured to recognize a gesture performed by a user according to the sensor output of the sensor, and to perform a particular action upon recognizing the gesture. However, many devices are preconfigured with such gestures, and the recognition is specific to the sensors of the device, and is not specific to the manner in which a particular user performs the gesture. Presented herein are techniques for enabling a device to recognize a new gesture by monitoring the sensor output of any sensors provided by the device while the user performs the gesture, optionally requesting repeated gesture performances until reaching a recognition confidence. Once trained to recognize the gesture according to the sensor outputs of the particular sensors of the device, the device may subsequently recognize the gesture performed by the user and execute an associated action.

20 Claims, 9 Drawing Sheets

_US 9,405,377 B2_

TRAINABLE SENSOR-BASED GESTURE RECOGNITION

BACKGROUND

Within the field of computing, many scenarios involve a gesture performed by a user and recognized by a sensor of a device. In many such scenarios, the device features one or more sensors, such as an accelerometer, a microphone, and/or a touch-sensitive display. The device may be preprogrammed by a manufacturer to recognize a number of gestures performed by the user, such as raising the phone the ear; performing a "pinch" gesture on the touch-sensitive display; and placing the phone face-down on a horizontal surface. The device may be programmed, e.g., by identifying a model sensor output of a sensor when a gesture is performed by a typical user, such that when a particular user performs the gesture in a similar manner as a typical user, the device is capable of recognizing the gesture by comparing the sensor output with that of the model sensor output representing the gesture.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the configuration of a device with a set of preprogrammed gestures may enable a convenient mode of user input, such recognition features of the device are often not significantly configurable, and in particular are not adaptable to the user. For example, many such recognizers are statically trained to detect sensor output that approximates a typical example of the gesture, resulting in a recognition process that inaccurate both in false negatives (e.g., failing to recognize a performed gesture, because the user performs it differently than the typical user) and in false positives (e.g., making the range of sensor outputs associated with a gesture so broad that non-gestural changes are incorrectly interpreted as gestures). Moreover, the gesture preferences of the user are often not portable among the user's devices, or adaptable to changes in the set of sensors available to a device.

Presented herein are techniques that enable the configuration of a device by a user to recognize a new gesture, and to assign the new gesture to an action to be performed upon detecting the gesture during a recognition mode. In accordance with these techniques, while in a recognition mode, the device monitors the sensor output of the one or more sensors of the device while the user performs a gesture, and identifies a set of identified sensor outputs that correspond to the gesture. The device may then accept an association of an action with the gesture that is to be performed when the device detects the identified sensor outputs of the sensors. In this manner, the device may enable the user to specify new gestures, to calibrate a gesture according to the particular manner performed by the user, and/or to configure the associations of gestures and actions performable by the device, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
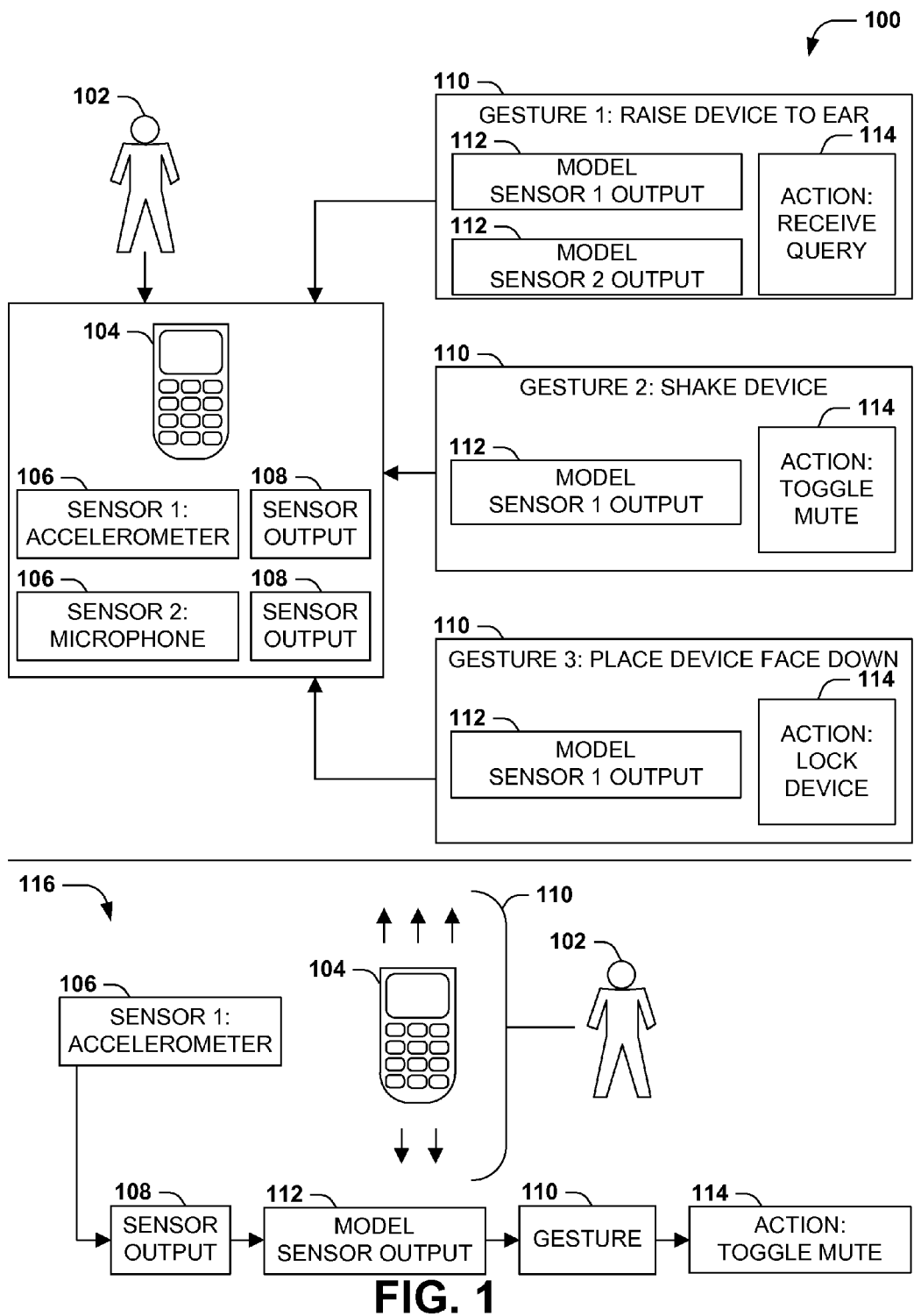
FIG. 1 is an illustration of an exemplary scenario featuring a device configured to identify a set of gestures, and to perform such gestures upon detecting the performance of the gesture by the user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an exemplary scenario 100 featuring a user 102 of a device 104 that is configured to detect a gesture 110 performed by the user 102, and to perform an action 114 in response to the gesture. In this exemplary scenario 100, the device 104 features a first sensor 106 comprising an accelerometer that is capable of detecting the orientation and/or motion of the device, and a second sensor 106 comprising a microphone that is capable of detecting ambient sound. The device 104 is preconfigured to detect gestures 110 performed by the user by comparing the sensor output 108 with a model sensor output 112 that is associated with each gesture 110. The model sensor output 112 may comprise, e.g., a model of the sensor output 108 of the respective sensors 106 when a typical user performs the gesture 110, or an abstraction or template synthesized to approximate the sensor output 108 during the performance of the gesture 110. The device 104 is also preconfigured with a set of actions 114 selected by a developer or manufacturer of the device 104 that are to be performed upon detecting each gesture 110. For example, upon detecting a first gesture 110 wherein the user 102 raises the device 104 to his or her ear and begins speaking into the microphone, the device 104 may perform the action 114 of receiving a query from the user 102. Upon detecting a second gesture 110 wherein the user 102 shakes the device, the device 102 may perform the action 114 of toggling the volume of the device 104 between an audible setting and a mute setting. Upon detecting a third gesture 110 wherein the user 102 places the device 102 face down on a horizontal surface, the device 104 may perform the action 114 of activating the lock function of the device 104. Additionally, the device 104 may be preconfigured only to use particular sensors 106 for each gesture 110; e.g., the first gesture 110 may be detected by comparing the sensor output 108 of both sensors 106 with the model sensor output 112, but the second gesture 110 may be detected only using the sensor output 108 of the first sensor 106.

Accordingly, during use 116, the user 102 may perform a gesture 110 such as shaking the device 104. The device 104 may monitor the sensor output 108 of the respective sensors 106, and may compare the model sensor output 112 with the sensor outputs 108 of the respective sensors 106 to detect the gesture 110. Upon such detection, the device 104 may perform the action 114 associated with the performed gesture 108. In this manner, the device 104 may enable the performance of gestures 110 by the user 102 to control the operation of the device 104.

However, it may be appreciated that when a device 102 is preconfigured by a manufacturer or developer to recognize gestures performed by a user 102 in accordance with the exemplary scenario 100 of FIG. 1, a variety of disadvantages may arise.

As a first example, the manner in which a typical user performs a gesture 110 may not correspond with that of the particular user 102. For example, for a gesture 110 such as shaking the device 104, different users 102 may perform the shaking with different duration, frequency, intensity, and direction. It may be difficult to configure the device 104 to recognize the "shake" gesture 110 as performed by any user 102, without increasing the rate of false-positives in the recognition process (e.g., simply interpreting any manner of shaking the device 104 as the gesture 110 may cause the device 104 to perform the action 114 during other events, such as a vibration of the device while carried in a pocket).

As a second example, a user 102 may wish to create a new gesture 110 that the sensors 106 of a device 104 are capable of recognizing. However, devices 104 configured as illustrated in the exemplary scenario 100 of FIG. 1 may be capable only of recognizing the specific set of predefined gestures 110, and may not provide the ability of a user 104 to define and describe a new gesture 110. Additionally, a user 102 may wish to associate a new or previously recognized gesture 110 with a particular action 114, but the device 104 may not robustly permit the user 102 to specify associations between a gesture 110 and an action 114; e.g., the device 104 may be preprogrammed to associate the "pinch" touch-based gesture 110 only with the "zoom out" action 114, and may not permit the user 102 to reassign this gesture 110 to another action 114.

As a third example, a user 102 may use a set of devices 104, or may switch from a first device 104 to a second device 104. The user 102 may still want to utilize the gestures 110 that were defined on the first device 102 while using a second device 104, but the preprogrammed set of recognized gestures 110 and associated actions 114 on the second device 104 may differ from that provided by the first device 104. That is, devices 104 do not typically exchange information about which gestures 110 a user 102 utilizes, and the actions 114 responsive to such gestures 110.

As a fourth example, the set of sensors 106 on a particular device 104 may change, or may differ between a first device 104 and a second device 104 of the user 102. It may therefore be difficult for a device 104 to translate the recognition of the gesture 110 using a first sensor 106 or sensor set to the recognition of the gesture 110 using a second sensor 106 or sensor set, even if the second sensor 106 is just as capable of recognizing the gesture 110 as the first sensor 106. For these and other reasons, the preconfiguration of the device 104 to recognize gestures as provided by the manufacturer or developer of the device, without significant ability of the user 102 to adjust the recognized gestures 108 and performed actions 114, may result in limitations in the usability of the device 104 by the user 102.

B. Presented Techniques

Figure 2:
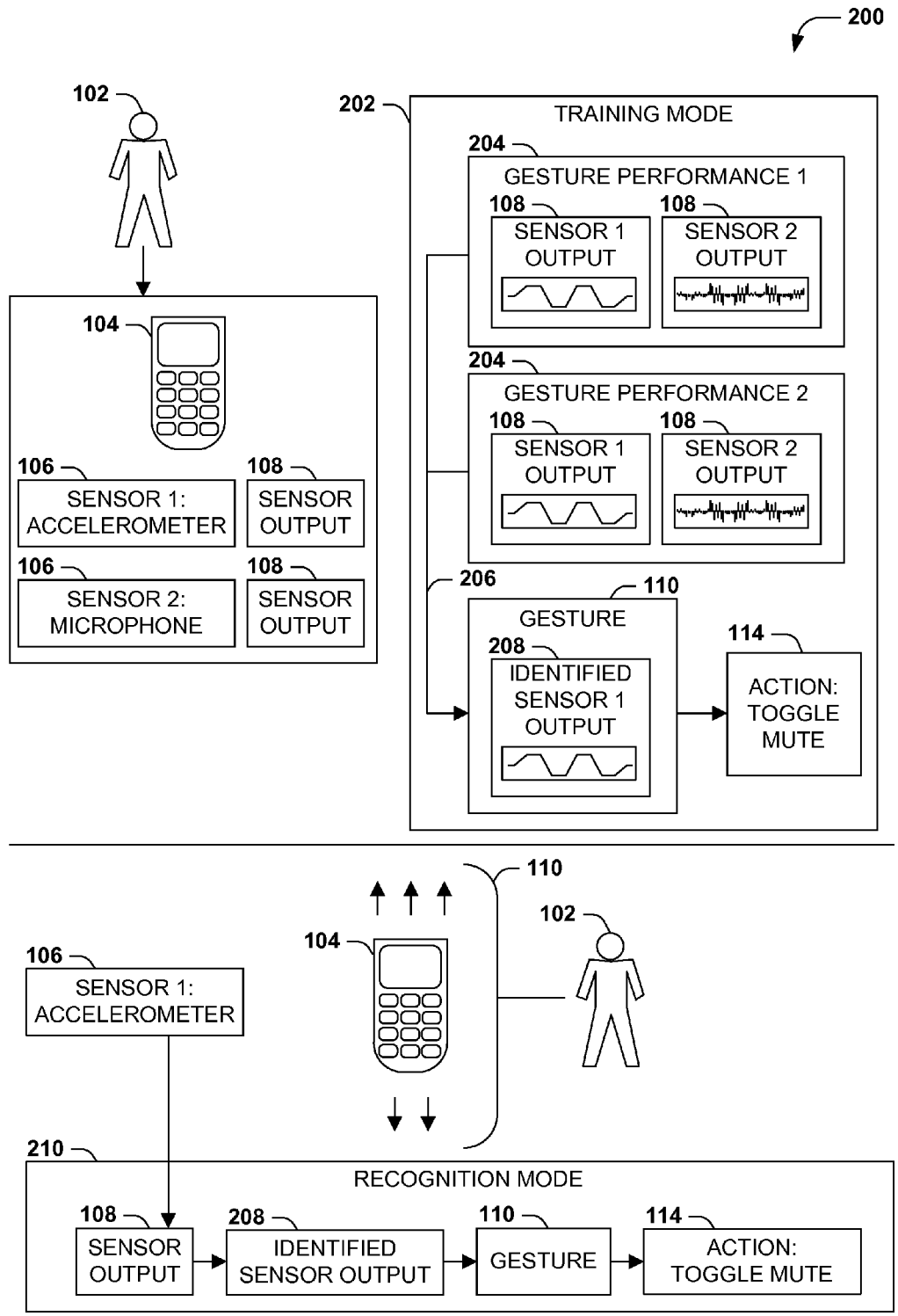
FIG. 2 is an illustration of an exemplary scenario featuring a device configured to identify an identified sensor output of a sensor that is associated with a gesture performed by a user and to be associated with an action, and the performance of the action upon detecting the performance of the gesture by the user, in accordance with the techniques presented herein.

FIG. 2 presents an illustration of an exemplary scenario 200 featuring a device 104 that is capable of adjusting the recognition of gestures 110 and performance of actions 114 to the preferences of a user 102. In this exemplary scenario 200, the device 104 may provide a training mode 202, wherein the user 102 may train the device 104 to recognize a new gesture 110 or the particular manner in which the user 102 performs a known gesture 110. For example, the device 104 may comprise a first sensor 106 comprising an accelerometer and a second sensor 106 comprising a microphone. The device 104 may request the user 102 to perform one or more gesture performances 204 of a gesture 110, and may monitor the sensor output 108 of each sensor 106 during each gesture performance 204. Upon detecting a correspondence in the sensor output 108 of one or more sensors 106 during the gesture performances 204 of the gesture 110, the device 104 may identify an identified sensor output 208 of one or more sensors 108 that is associated with the gesture 110. For example, while the user 102 performs a gesture 110 such as shaking the device the device 104 may determine that the accelerometer provides a consistent set of sensor output 108 during each such gesture performance 204, but may be unable to detect such consistent sensor output 108 from the microphone. Accordingly, the device 104 may identify an identified sensor output 208 from the first sensor 106 as identifying the gesture 110. The device 104 may also allow the user 102 to select an action 114 to be performed by the device 104 upon detecting the performance of the gesture 110 by the user 102, and may store the association of the gesture 110, the identified sensor output 208, and the action 114.

As further illustrated in the exemplary scenario 200 of FIG. 2, during a recognition mode 210, the user 102 may perform the gesture 110. The device 104 may compare the sensor output 108 of the sensors 108 with the identified sensor output 208 associated with each gesture 110, as determined during the training mode 202. Upon detecting a match, the device 104 may determine that the gesture 110 has been performed, and may perform the action 114 associated with the gesture 110. In this manner, the device 104 enables the user 102 to teach new gestures 110 to the device 104, and to train the device 104 in recognizing the particular manner in which the user 102 performs known gestures, in accordance with the techniques presented herein.

C. Exemplary Embodiments

Figure 3:
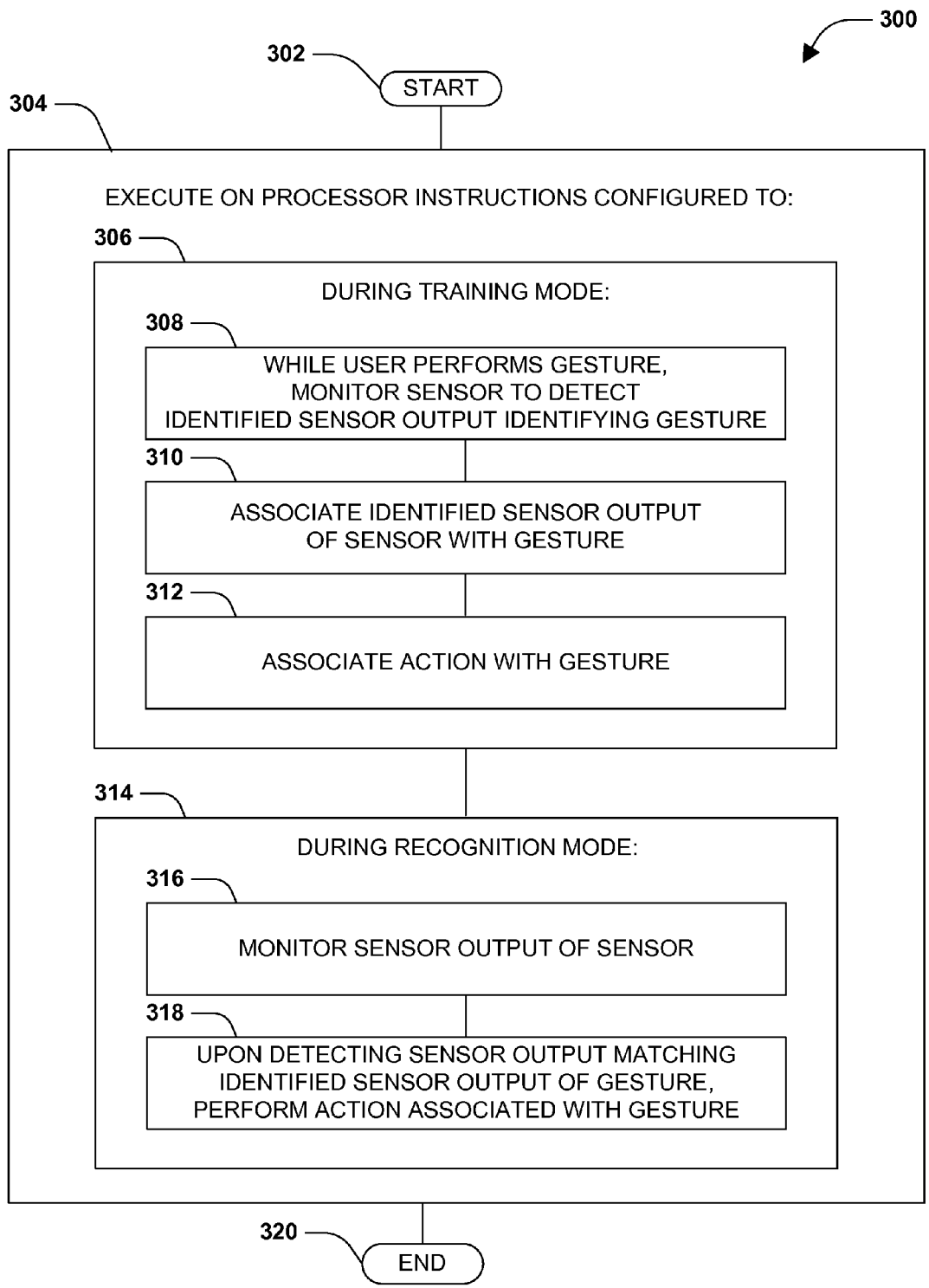
FIG. 3 is an illustration of a first exemplary method of configuring a device to recognize gestures and to perform associated actions in accordance with the techniques presented herein.

FIG. 3 presents an illustration of an exemplary first embodiment of the techniques presented herein, illustrated as an exemplary method 300 of enabling a device 104 comprising one or more sensors to perform actions 114 upon detecting a gesture 110 performed by a user 102. The exemplary first method 300 may be implemented, e.g., as a set of instructions stored in a memory component (e.g., a memory circuit, a platter of a hard disk drive, a solid-state storage device, or a magnetic or optical disc) of a device having a processor, where the instructions, when executed on the processor, cause the device to operate according to the techniques presented herein. The exemplary first method 300 begins at 302 and involves executing 304 the instructions on the processor of the device. In particular, the execution of the instructions on the processor causes the device 104 to, during 306 a training mode 202, while the user 102 performs the gesture 110, monitor 308 the sensor 106 to detect an identified sensor output 208 identifying the gesture 110. The execution of the instructions on the processor 104 also causes the device to, during 306 the training mode 202, associate 310 the identified sensor output 208 of the sensor 106 with the gesture 110, associate 312 an action with the gesture 110. The execution of the instructions on the processor also causes the device 104 to, during 314 a recognition mode 210, monitor 316 the sensor output 108 of the sensor 106; and upon detecting that the sensor output 106 matches the identified sensor output 208 associated with the gesture 110, perform 318 the action 114 associated with the gesture 110. In this manner, the exemplary first method 300 causes the device to recognize gestures 110 and to perform actions 114 associated therewith in accordance with the techniques presented herein, and so ends at 320.

Figure 4:
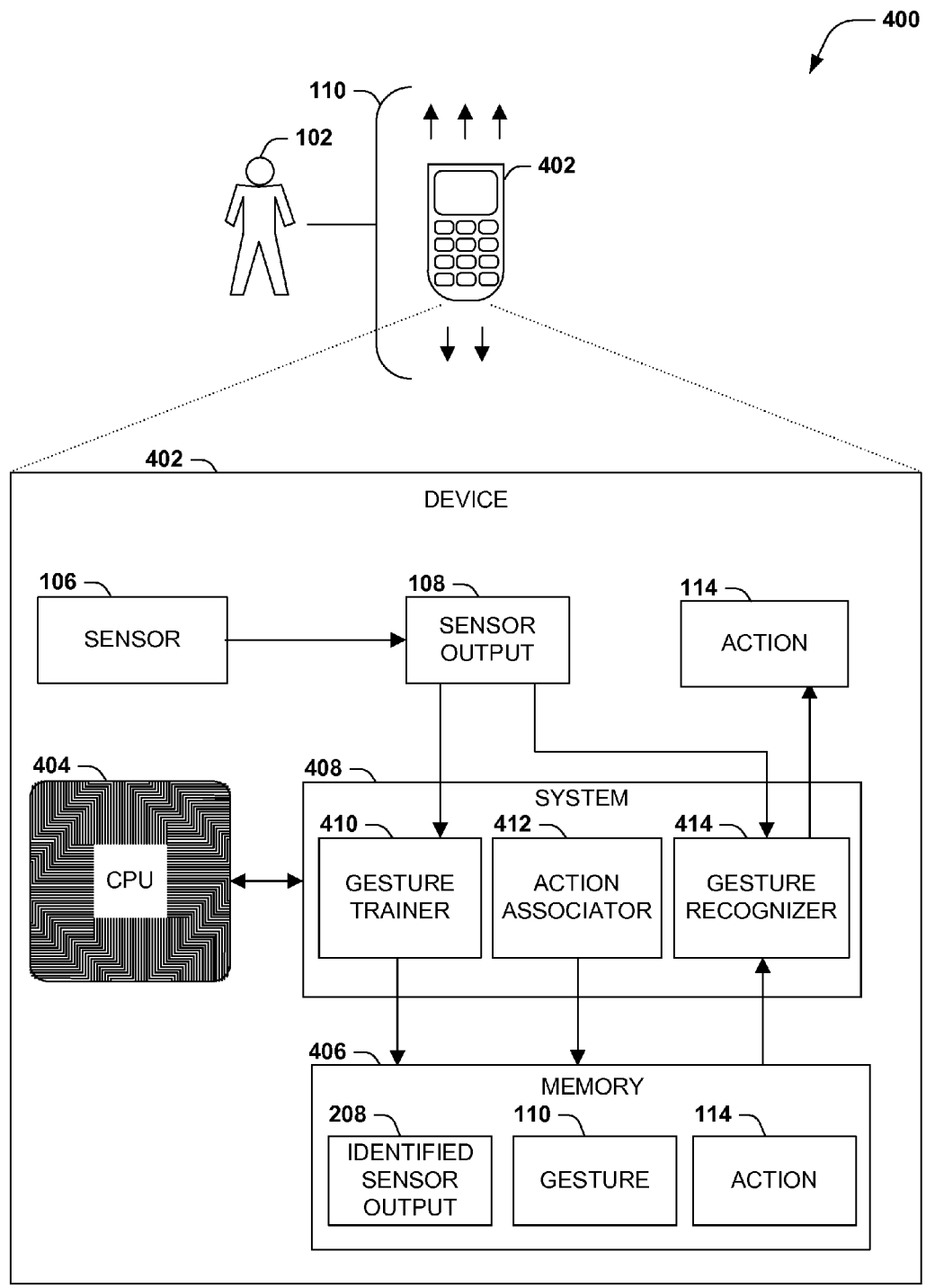
FIG. 4 is a component block diagram illustrating an exemplary device comprising a system for recognizing gestures and performing associated actions in accordance with the techniques presented herein.

FIG. 4 presents an illustration of an exemplary scenario 440 featuring a second embodiment of the techniques presented herein, illustrated as an exemplary device 402 comprising an exemplary system 408 that enables the exemplary device 402 to perform actions 114 associated with gestures 110 performed by a user 102. The exemplary device 402 also comprises a processor 404, a memory 406, and at least one sensor 106 providing sensor output 108. One or more components of the exemplary system 406 may be implemented, e.g., as instructions stored in a memory component of the exemplary device 402 that, when executed on a processor 404, cause the exemplary device 402 to perform at least a portion of the techniques presented herein. Alternatively (though not shown), one or more components of the exemplary system 406 may be implemented, e.g., as a volatile or nonvolatile logical circuit, such as a particularly designed semiconductor-on-a-chip (SoC) or a configuration of a field-programmable gate array (FPGA), that performs at least a portion of the techniques presented herein, such that the interoperation of the components completes the performance of a variant of the techniques presented herein. The exemplary system 406 includes a gesture trainer 410 that, while the user 102 performs a gesture 110, monitors the sensor output 108 of the sensor 106 to detect an identified sensor output 208 identifying the gesture 110, and stores the identified sensor output 208 for the gesture 110 in the memory 406 of the exemplary device 402. The exemplary system 408 also includes an action associator 412 that, upon receiving from the user 102 an action 114 to be associated with the gesture 110, stores in the memory 406 of the exemplary device 402 an association of the action 114 with the gesture 110. The exemplary system 408 also includes a gesture recognizer 414 that monitors the sensor output 108 of the sensor 106 to detect the identified sensor output 208 identifying the gesture 110, causes the exemplary device 402 to perform the action 114 associated in the memory 406 with the gesture 110 associated with the identified sensor output 208. In this manner, the exemplary system 408 enables the exemplary device 402 to perform actions 114 in response to the performance of gestures 110 by the user 102 in accordance with the techniques presented herein.

Still another embodiment involves a computer-readable medium comprising processor-executable instructions configured to apply the techniques presented herein. Such computer-readable media may include, e.g., computer-readable memory devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that excludes computer-readable memory devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
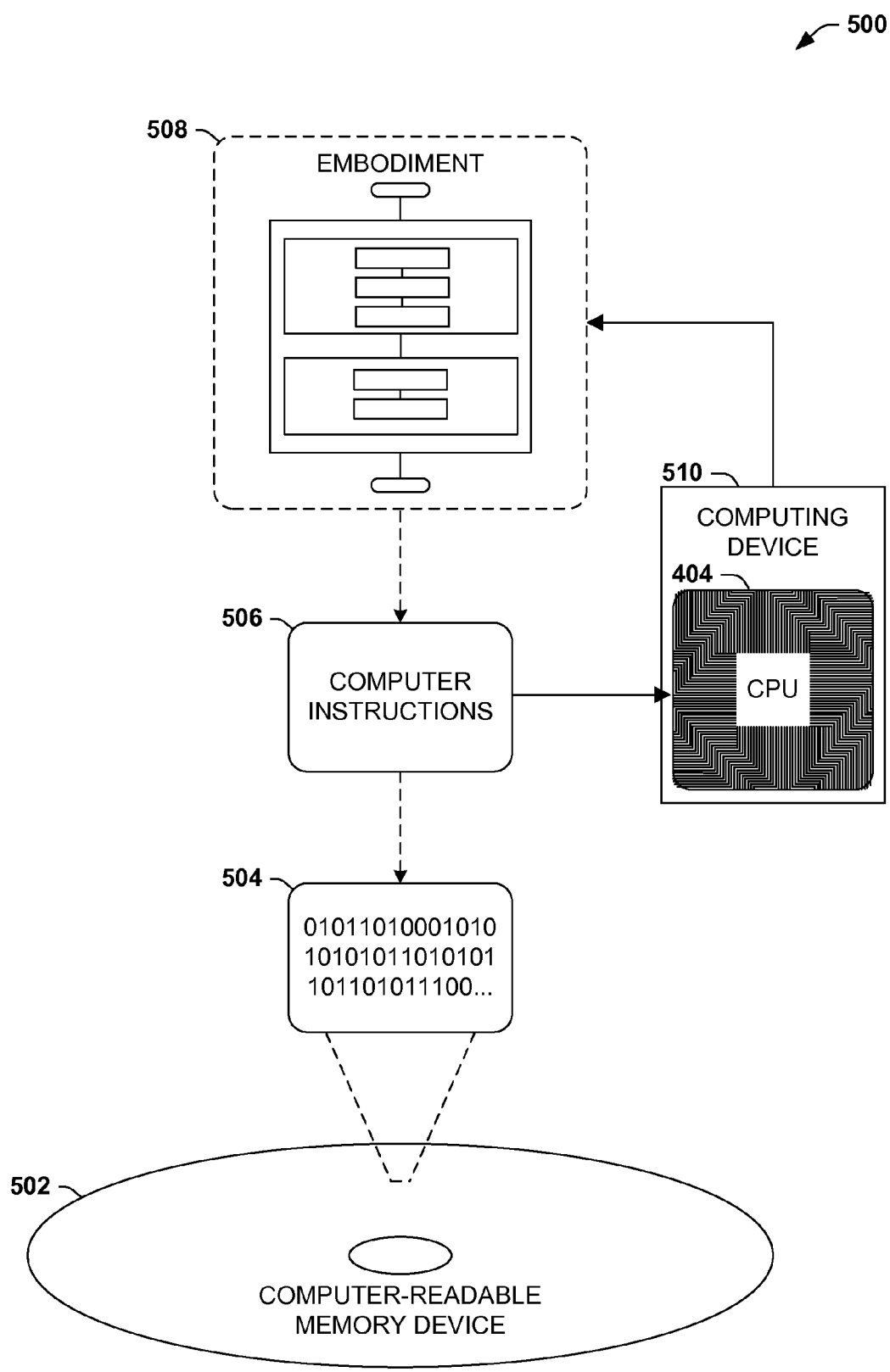
FIG. 5 is an illustration of an exemplary computer-readable medium including processor-executable instructions configured to embody one or more of the provisions set forth herein.

An exemplary computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that are executable on a processor 404 of a device 104, and that cause the device 104 to operate according to the principles set forth herein. In a first such embodiment, the execution of the instructions 506 on a processor 404 of a device 104 may cause a device to perform a method 508 of configuring a device to perform actions 114 in response to the detection of gestures 110 performed by a user 102, such as the exemplary method 300 of FIG. 3. In a second such embodiment, the execution of the instructions 506 on a processor 404 may implement one or more components of a system for performing actions 114 in response to gestures 110 performed by a user 102, such as the exemplary system 408 of the exemplary device 402 FIG. 4. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques.

Moreover, some variations may be implemented in combination, and some combinations may feature additional advantages and/or reduced disadvantages through synergistic cooperation. The variations may be incorporated in various embodiments (e.g., the exemplary first method 300 of FIG. 3; the exemplary device 402 and/or the exemplary system 408 of FIG. 4; and the exemplary computer-readable memory device 502 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques provided herein may be implemented on a variety of device 104, such as workstations; servers; laptops; tablet and palmtop-factor mobile devices; mobile phones; portable gaming devices; portable media players; media display devices, such as televisions; appliances; home automation devices; medical devices; and wearable computing devices, such as eyewear, headsets, earpieces, and wristwatches.

As a second variation of this first aspect, the techniques provided herein may be used with many types of sensors 106 providing many types of sensor output 108, such as cameras providing still or moving images; microphones providing samplings of ambient sound; touch-sensitive displays providing touch input from the user 102 via a digit or stylus; motion detectors providing a detection of motion; temperature sensors providing a temperature reading; lidar detectors providing lidar data; biometric sensors providing a biometric identifier of a user 102; accelerometers or gyroscopes providing readings of the orientation and/or motion of the device 104; and compasses providing a directional orientation of the device 104.

As a third variation of this first aspect, the techniques presented herein enable devices 104 to detect many types of gestures 110, including manipulation of the orientation and/or motion of the device 104; a physical interaction of the user with the device 104, such as drawing a gesture on a touch-sensitive display of the device 104, or squeezing a pressure-sensitive element of the device 104; a manual gesture performed with a hand or arm of the user 102, such as a hand sign; a sound performed by the user 102, such as blowing into a microphone of the device 104; and a facial expression, posture, or gait of the user 102.

As a fourth variation of this first aspect, the techniques presented herein enable devices 104 to perform a variety of actions 114 in response to such gestures 110, such as invoking an application; sending a message; displaying an image or text on a display of the device 402; or activating a peripheral device, such as a light-emitting diode (LED) attached to the device 402.

Figure 6:
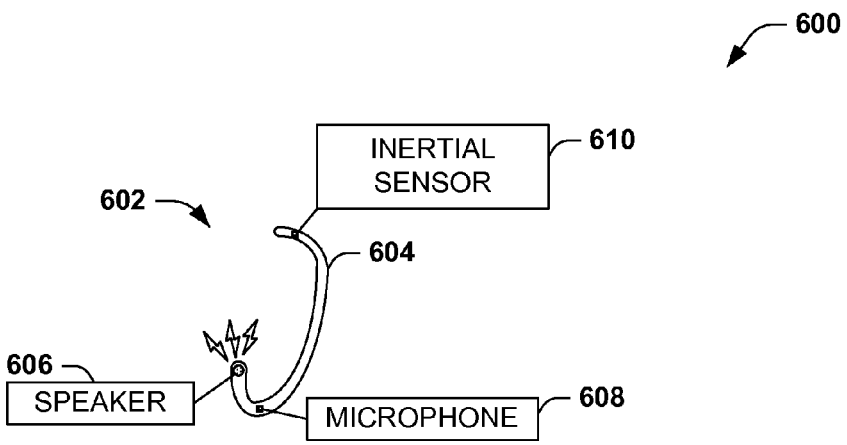
FIG. 6 is an illustration of an exemplary mobile device in which the techniques provided herein may be utilized.
Figure 6:
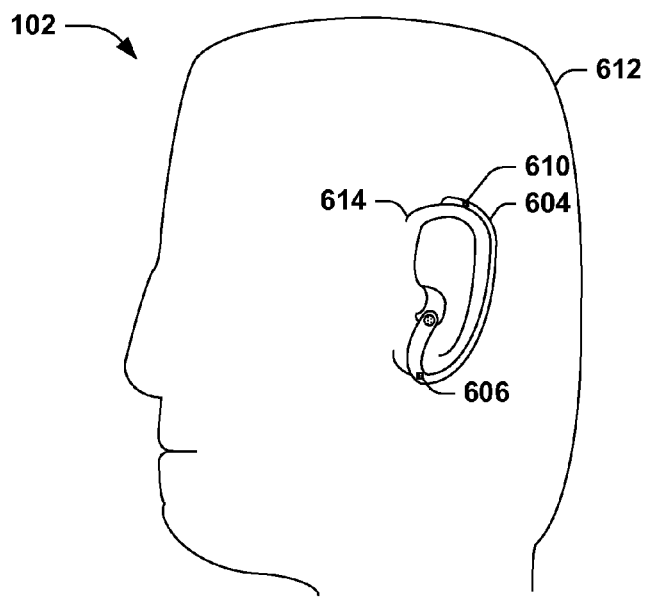
Figure 6:
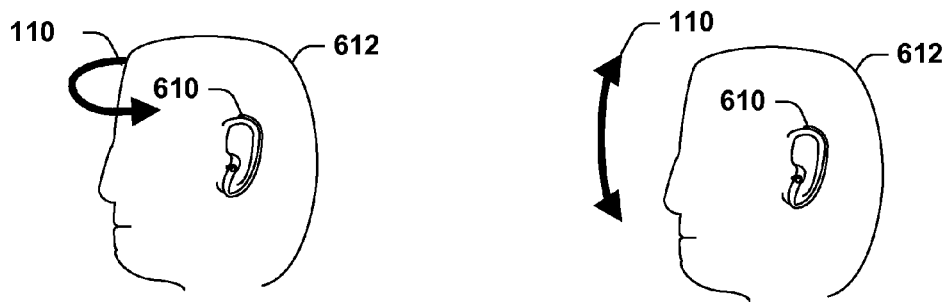

FIG. 6 is an illustration of an exemplary scenario 600 featuring one such device, comprising an earpiece device 602 comprising a housing 604 wearable on an ear 614 of a head 612 of a user 102, and comprising a speaker 606 positionable near the ear 614 of the user 102, a microphone 608, and an inertial sensor 610 (e.g., an accelerometer). During wearing by the user 102, the device 104 may detect one or more gestures 110 performed with the head 612 of the user 102, such as shaking the head left and right, or nodding the head up and down. Such gestures 110 may be detected by monitoring the sensor output 108 of each sensor 106, e.g., detecting changes in the orientation of the earpiece device 604 according to changes in the sensor output 108 of the inertial sensor 610. In accordance with the techniques presented herein, the earpiece device 640 may enable the user 102 to specify new gestures 110 performable with the head 612 of the user 102, such as tilting the head 612 to one side, or looking downward while speaking, and may allow the user 102 to specify an action 114 to be performed by the earpiece device 604 upon detecting such gestures 110 by the user 102. Many such variations may be included in embodiments of the techniques presented herein.

D2. Gesture Profile

Figure 8:
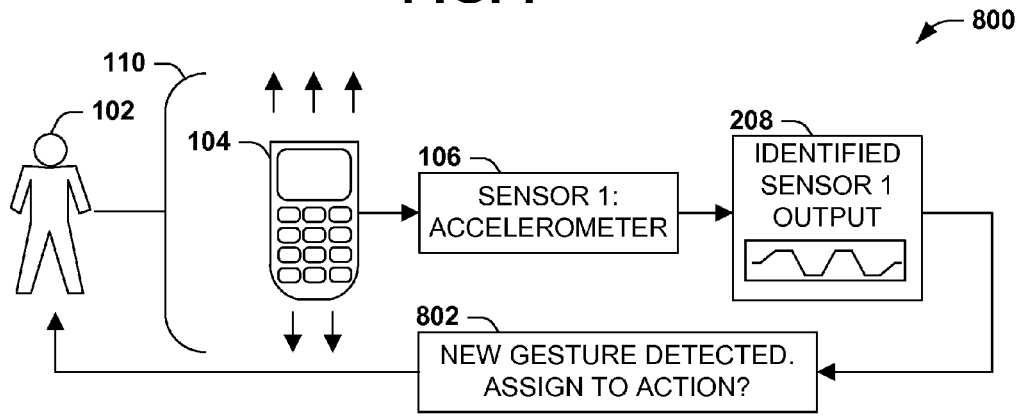
FIG. 8 is an illustration of an exemplary scenario featuring a technique for invoking a training mode upon detecting a new gesture performed by the device in accordance with the techniques presented herein.

FIG. 8 presents an illustration of an exemplary scenario featuring a second aspect that may vary among embodiments of the techniques presented herein, involves the generation of a gesture profile 702 storing a set of gestures 110 defined by the user 102 and applied by a device 104 to perform actions 114. In this exemplary scenario 700, a user 102 possesses three devices 104, each having a set of sensors 106 that provides various forms of sensor output 108, such as a phone device and a tablet device that each utilize an accelerometer 106 to detect changes in orientation and/or motion of the device 104, and a geopositioning device including a compass 106 that is capable of detecting a bearing of the device 104. Utilizing the techniques provided herein, the user 102 configures the first device 104 to recognize a set of gestures 110, such as shaking the first device 104 and placing the first device 104 face-down on a horizontal surface, according to the identified sensor output 208 of the accelerometer sensor 106, and also specifies an action 114 to be performed when the user 102 performs each gesture 110 with the first device 104. However, the user 102 may also wish to use such gestures 110 with the second device 104 and the third device 104, without having to retrain each device 104 to recognize the gestures 110 and to associate the actions 114 with the gestures 110; i.e., the user 102 may simply wish the gesture information to be synchronized across the devices 104 to provide a consistent gesture interface.

Figure 7:
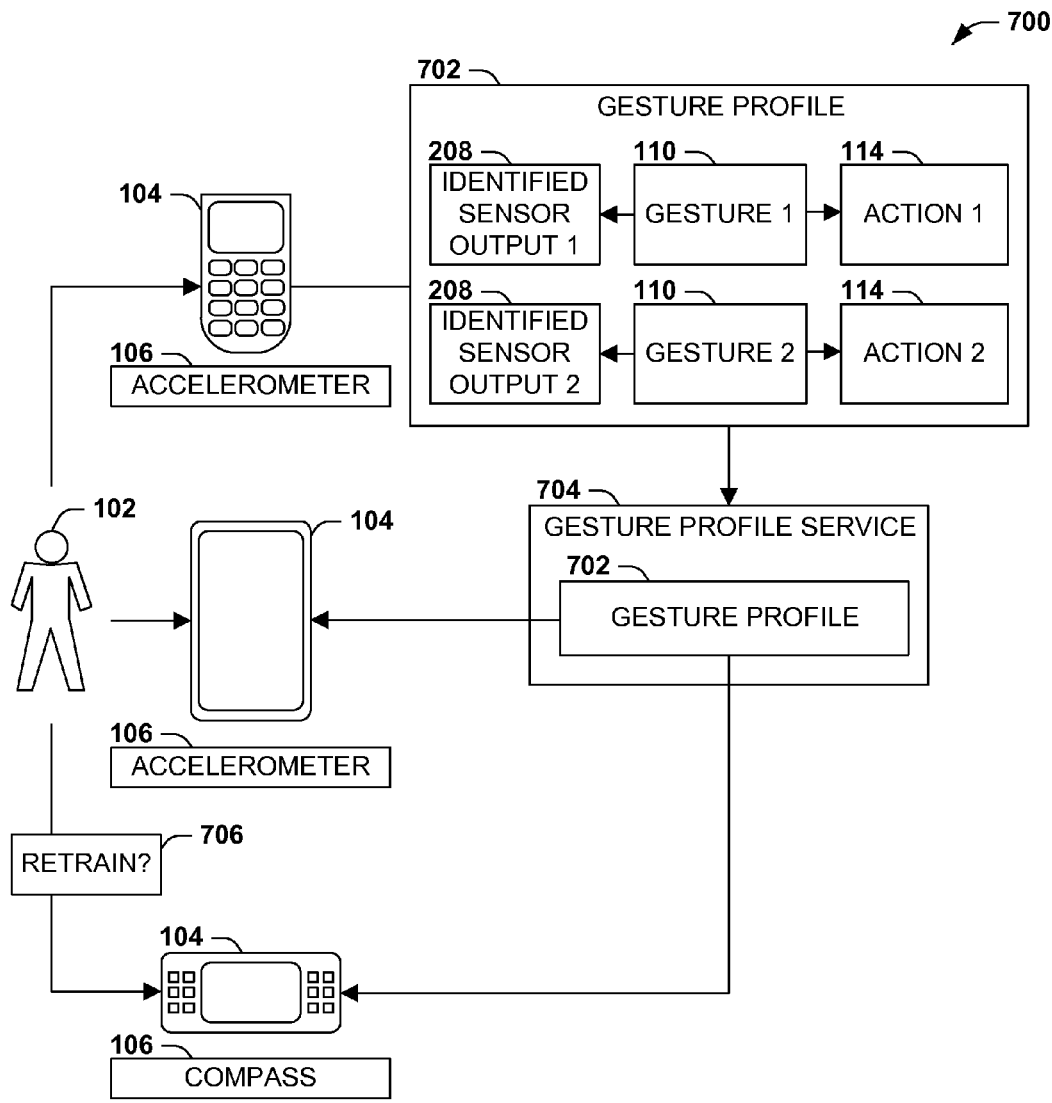
FIG. 7 is an illustration of an exemplary scenario featuring a gesture profile service enabling the sharing of gesture information between a plurality of devices utilized by a user in accordance with the techniques presented herein.

As further illustrated in the exemplary scenario 2700 of FIG. 7, a gesture profile service 704 may be provided to store the gesture profile 704 of the first device 104, and to deliver the gesture profile 704 to the other devices 104, each of which may apply the gesture profile 702 using the sensors 106 of each device 104. The second device 104 may also have an accelerometer sensor 106, and may be capable of utilizing the identified sensor output 208 identified by the accelerometer sensor 106 of the first device 104. However, the third device 104 may only have a compass sensor 106 that is not capable of utilizing the identified sensor output 208 of an accelerometer sensor 106 to detect the gesture 110. Accordingly, the third device 706 may ask the user 102 to retrain the device 104 in order to recognize the gesture 110, and upon receiving an acceptance form the user 104, may enter the training mode 202 to identify the identified sensor output 208 of the compass sensor 106 to detect the gestures 110. Alternatively, the third device 104 and/or the gesture profile service 704 may detect the mismatch between the compass sensor 106 of the third device 104 and the accelerometer sensor 106 of the first device 104, and may attempt to translate the identified sensor output 208 of each gesture 110 for the accelerometer sensor 106 into an identified sensor output 208 of the compass sensor 106 for use by the third device 104. In this manner, the gesture profile service 704 may enable the set of devices 104 of the user 102 to recognize and respond to gestures 110 performed by the user 102 in accordance with the techniques presented herein.

D3. Initiating Training Mode

A third aspect that may vary among embodiments of the techniques presented herein involves the initiation of a training mode 202 of the device 104, in order to identify the identified sensor output 208 of the respective sensors 106 of the device 104 for the respective gestures 110 to be performed by the user 102.

As a first variation of this third aspect, a device 104 may transition to a training mode 202 at the request of the user 102, or upon an initial activation of the device 104, such as a setup process for a newly acquired device 104.

As a second variation of this third aspect, a device 104 may transition to a training mode 202 upon detecting a change in the set of sensors 106 accessible to the device 104, such as the addition to the device 104 of an added sensor. The addition, change, and/or removal of sensors 106 may alter the manner in which the device 104 detects gestures 110 performed by the user 102; e.g., a device 104 may adequately detect a gesture 110 with the identified gesture output 208 of a first sensor 106, but may more accurately detect the gesture 110 by also using the identified gesture output 208 for a second, added sensor 106. Accordingly, upon such detection, the device 104 may transition to the training mode 202 to detect the identified sensor output 208 of the added sensor while the user 102 performs the gesture 110.

FIG. 8 presents an illustration of an exemplary scenario 800 featuring a third variation of this third aspect, wherein the device 104 detects sensor input 108 indicating a performance by the user 102 of a gesture 110 that is not associated with an identified sensor output 208. As a first example, the user 102 may be performing a new gesture 110 that is not yet recognized by the device 104. As a second example, the user 102 may be performing a gesture 110 that is recognized by the device 104 but that is performed by the user 102 in a different manner than the device 104 currently recognizes within a recognition confidence threshold, such that the device 104 often fails to recognize the gesture 110). Upon detecting sensor output 108 indicating that the user 104 is performing or has performed a gesture 110 that is not recognized, the device 104 may select an identified sensor output 208 for the gesture 110, and may transition to the training mode 202 to allow the user 102 to assign the gesture 110 to an action 114.

As a fourth variation of this third aspect, the device 104 may detect that one or more sensors 106 of the device 104 are miscalibrated (e.g., a camera may be slightly rotated from a prior orientation). For example, the sensor 106 may be providing sensor data 108 that is not consistent with the sensor data 108 of other sensors 106, that is not consistent with past sensor data 108 from the same sensor 106, or with an anticipated result in a particular context. While such miscalibration may alter the sensor data 108 and may impair the detection of a match with an identified sensor output 208, the device 102 may remain capable of using the sensor 106 to detect the gesture 110 if retrained. Accordingly, upon detecting such a miscalibration of a sensor 106, the device 104 may transition to the training mode 202 to retrain the device 104 to recognize the gestures 110.

As a fifth variation of this third aspect, a device 104 may receive a gesture profile 702 (e.g., from a second device 104 or a gesture profile service 704) specifying a gesture 110 that is identified according to an identified sensor output 208 that is not compatible with the sensors 106 of the first device 104, such as the third device 104 in the exemplary scenario 700 of FIG. 7. Accordingly, the device 104 may transition to the training mode 202 to train the sensor 106 to recognize the gesture 110. These and other variations may be utilized to prompt a device 104 to transition to a training mode 202 in order to detect new gestures 110, or to adjust the detection or response of known gestures 110, in accordance with the techniques presented herein.

D4. Training Mode

A fourth aspect that may vary among embodiments of the techniques presented herein involves the configuration of the training mode 202 of the device 104 to identify the identified sensor output 208 for respective gestures 110, and the actions 114 to be performed in response thereto.

As a first variation of this fourth aspect, many types of learning techniques may be included in a training mode 202 in order to identify, from one or more sensor outputs 108 of one or more sensors 106 while the user 102 performs a gesture 110, the identified sensor output 208 enabling the identification of the gesture 110. Such learning techniques may include, e.g., evaluation by statistical techniques such as arithmetic mean, median, mode, and standard deviation; Bayesian algorithms; fuzzy logic; artificial neural networks; and genetic algorithms.

As a second variation of this fourth aspect, the training mode 202 may involve two or more gesture performances 702 of the gesture 110 by the user 102; e.g., the user 102 may repeatedly perform the gesture 110 in order to enable higher recognition accuracy. The device 104 may, during the respective at least two gesture performances 702 of the gesture 110 by the user 102, monitor the sensors 106 to detect the identified sensor outputs 208 identifying the gesture 110 during the gesture performance 702, and determine the identified sensor output 208 according to the identified sensor outputs 208 of the respective gesture performances 702 (e.g., as a statistical mean of the identified sensor outputs 208, with a precision recognition threshold identifying the range of deviation in the identified sensor output 208). In one such variation, the device 104 may compare the identified sensor outputs 208 during the respective gesture performances 902 to determine a recognition confidence, and may instruct the user 102 to repeat the gesture performance 902 while the recognition confidence is above a recognition confidence threshold; and upon determining that the recognition confidence is within the recognition confidence threshold, the device 104 may associate the identified sensor output 208 with the gesture 110.

As a third variation of this fourth aspect, the training mode 202 may be invoked by the user 102, and the device 104 may presume that a gesture 110 is being performed by the user 102 between training start request and a training completion request. The device 104 may therefore analyze the sensor output 108 of the respective sensors 106 to determine the identified sensor output 208 of the sensors 106 for the gesture 110 during this training period, and may transition back to recognition mode 210 upon completing such identification. As a further variation, the device 104 may identify at least one restricted period during the training period (i.e., that is shorter than the entire training period) when the gesture 110 is being performed by the user 102. For example, the device 104 may detect, during the training period 202, a pause at the beginning of the training period before the user 102 performs the gesture 110; a pause between respective gesture performances 702 of the gesture 110; and/or a pause at the end of the training period after the user 102 has completed performing the gesture 110). The device 104 may therefore select the identified sensor output 208 only during the restricted period(s).

As a fourth variation of this fourth aspect, where the device 104 comprises at least two sensors 106, the training mode 202 may involve determining the identified sensor outputs 208 using the sensor outputs 108 of the respective sensors 106. As one such variation, the device 104 may utilize both sensors 106 together to detect the gesture 110; e.g., while the user 102 shakes the device 104, an accelerometer may detect changes in the motion of the device 104, while a speaker detects fluctuations in the sound of air moving past the speaker that are concurrent with the changes in motion detected by the accelerometer. In accordance with this variation, while the user 102 performs the gesture, the device 104 may monitor the respective sensors 106 to detect the identified sensor outputs 208 of the sensors 108 that together identify the gesture 110, and may store the identified sensor outputs 208 of each sensor 106 in the memory of the device 104. During a recognition mode 210, the device 104 may monitor the sensor outputs 108 of the respective at least two sensors 108 for comparison with the corresponding identified sensor outputs 208 in order to detect the gesture 110.

Figure 9:
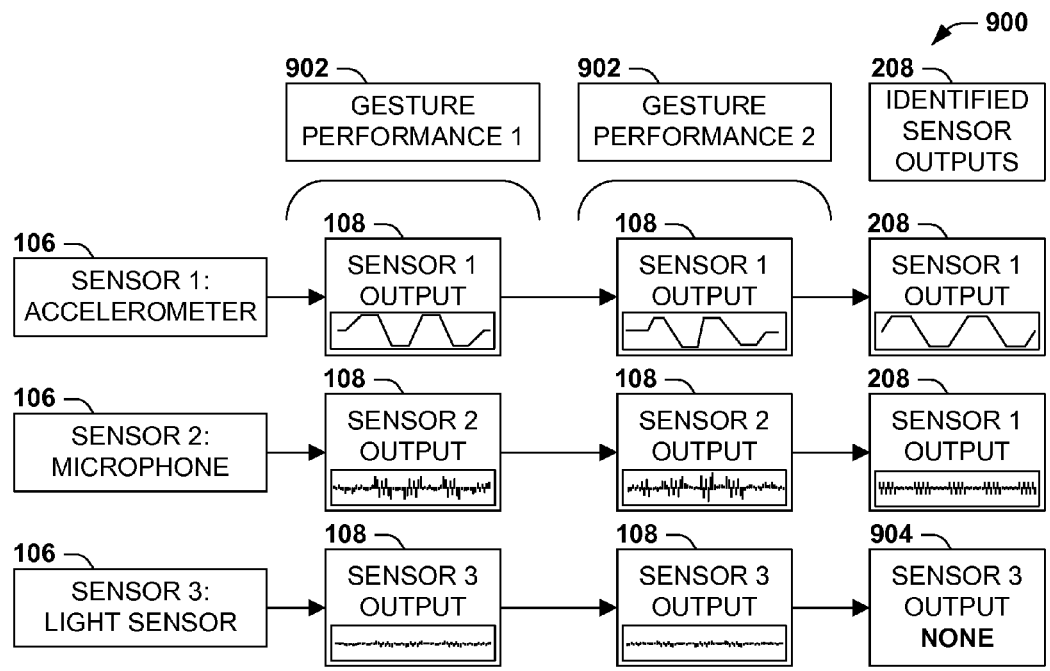
FIG. 9 is an illustration of an exemplary scenario featuring an identification of identified sensor output from a collection of sensors that identifies a gesture performed by a user in accordance with the techniques presented herein.

FIG. 9 presents an illustration of an exemplary scenario 900 featuring a fifth variation of this fourth aspect, wherein, during the training mode 202, a device 104 distinguishes among at least two sensors 106 into recognizing sensors that are capable of determining a particular gesture 110, and non-recognizing sensors that are not capable of determining the particular gesture 110. In this exemplary scenario 900, the device 104 comprises an accelerometer sensor 106, a microphone sensor 106, and a light sensor 106, each providing sensor output 108 over a different physical domain (e.g., motion, sound, and light). While a user 102 completes a set of gesture performances 902 of a gesture 110 such as shaking the device 104, the respective sensors 106 may respond differently; e.g., the accelerometer sensor 106 may exhibit sensor output 108 consistently indicating variations in the shaking motion, and the microphone sensor 106 may exhibit sensor output 108 consistently indicating changes in the sound of air moving past the microphone. However, the light sensor 106 may not reflect a consistent pattern of sensor output 108 during each gesture performance 902. Accordingly, the device 104 may, identifying at least one recognizing sensor providing an identified sensor output 208 that identifies the gesture 110 (e.g., the accelerometer sensor 106 and the microphone sensor 106), and at least one non-recognizing sensor that does not provide an identified sensor output 108 identifying the gesture 110 (e.g., the light sensor 106). The device may store the identified sensor outputs 208 of the recognizing sensors, and may optionally normalize the sensor outputs 108 of such sensors 106 across the gesture performances 902 to provide an identified sensor output 208 that applies to all such gesture performances 902, while excluding 904 the identified sensor outputs 28 of the non-recognizing sensors.

As a sixth variation of this fourth aspect, during the training mode 202, a device 104 may request the user 102 to identify the sensors 106 that are capable of detecting a particular gesture 110. For example, the user 102 may understand that a particular gesture 110 such as shaking the device 104 is more readily detectable by an accelerometer sensor 106 than a light sensor 106, and may specify this distinction to assist the training mode of the device 104. Upon receiving at least one selected sensor 106 from the user 102, the device 104 may monitor only the selected sensors while the user 102 performs the gesture 110 to detect the identified sensor output 208 identifying the gesture 110, and may store only the identified sensor outputs 208 of the selected sensors 106.

As a further example of this sixth variation of this fourth aspect, respective sensors 106 of the device 104 are associated with one or more sensor modalities (e.g., a light sensor 106 may detect changes in light levels; a motion sensor 106 may detect motion near the device; a biometric sensor may detect a biometric feature of a user 102, such as a facial expression; and a still camera may detect changes in light levels, nearby motion, and biometric features of the user 102). The device 104 may therefore identify the sensor modalities of the respective sensors 106, and may present to the user 102 options of which types of sensor modalities correspond to the gesture 110 that the user 102 wishes to have recognized (e.g., recognize a motion-based gesture, a light-based gesture, or a biometric gesture). While the user 102 performs the gesture 110, the device 104 may monitor only the sensors 104 that are associated with the selected sensor modality, and may store in the memory only the identified sensor outputs 208 of such sensors 106. Many such variations may be included in the training mode 202 of a device 104 in order to determine the identified sensor outputs 208 that enable a recognition of a gesture 110 in accordance with the techniques presented herein.

D5. Performing Actions

A fifth aspect that may vary among embodiments of the techniques presented herein involves the manner of performing actions 114 in response to the recognition of a gesture 110.

As a first variation of this sixth aspect, an action 102 may be associated with a context of the device 104, such as an executing mode, an application, or an application state of the device 104. For example, a recognized gesture 110 may cause a first action 114 to be performed if the device 104 is executing a first application, and a second action 114 if the device 104 is executing a second application (e.g., shaking the device 104 while using an email application causes the email application to fetch new mail, while shaking the device 104 while using a media playing application causes the media playing application to skip to a next media item in a playlist). Accordingly, in response to the detection of a gesture 110, the device 104 may detect a current device context, and may perform an action 114 that is associated both with the gesture 110 and the current device context of the device 104.

Figure 10:
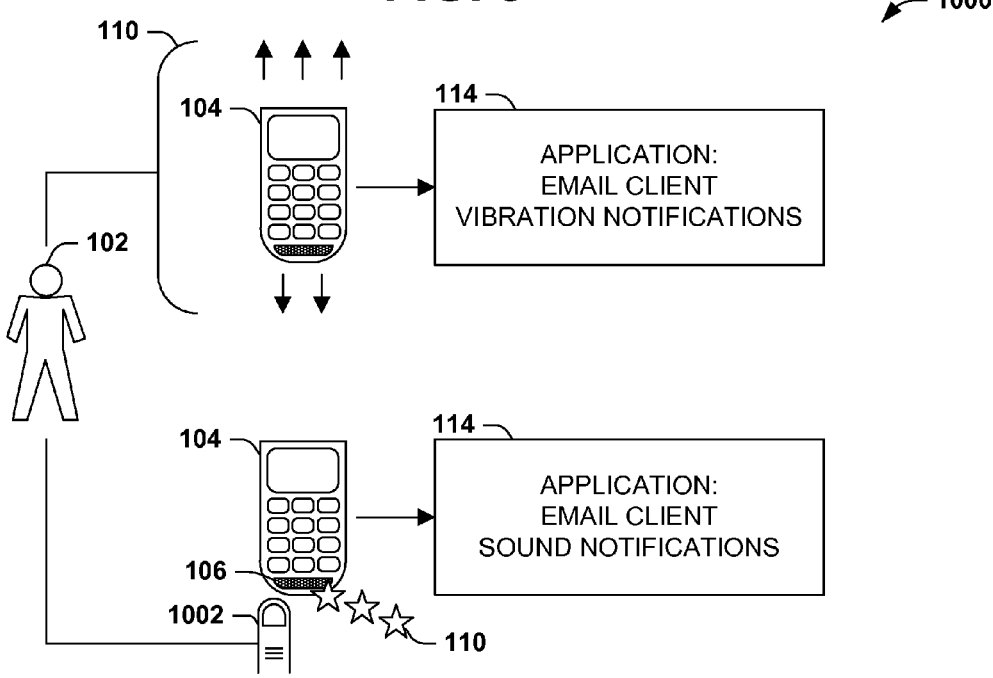
FIG. 10 is an illustration of an exemplary scenario featuring the execution of an action in response to a gesture, where the action is contextually related with the sensor that detected the gesture, in accordance with the techniques presented herein.

FIG. 10 presents an illustration of an exemplary scenario 1000 featuring a second variation of this fifth aspect, wherein the action 114 performed in response to a gesture 110 is related to the sensor 106 by which the gesture 110 was detected. In this exemplary scenario 1000, a device 104 may be capable of recognizing a first gesture 110 involving shaking the device 104 that may be detected according to the sensor input 108 of an accelerometer sensor 104, and a second gesture 110 involving the user 102 tapping a microphone sensor 106 of the device 104 with a digit 1002. Both gestures 1000 may result in the initiation of an action 114 with an email client of the device 104, such as selecting the manner in which the email client notifies the user 102 of new messages. However, the particular manner in which the action 114 is performed (e.g., the type of notification) may be related to the particular sensor 106 detecting the action 110. For example, the action 114 of shaking the device 104 may be construed as tactile input, and may cause the device 104 to provide such notifications in a tactile manner, such as via a vibration module; and the action 114 of tapping the microphone sensor 106 may be construed as sound input, and may cause the device 104 to provide such notifications in an audible manner, such as via an audio cue. These and other variations in the performance of the action 114 in response to a gesture 110 may be included in variations of the techniques presented herein.

E. Computing Environment

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

Figure 11:
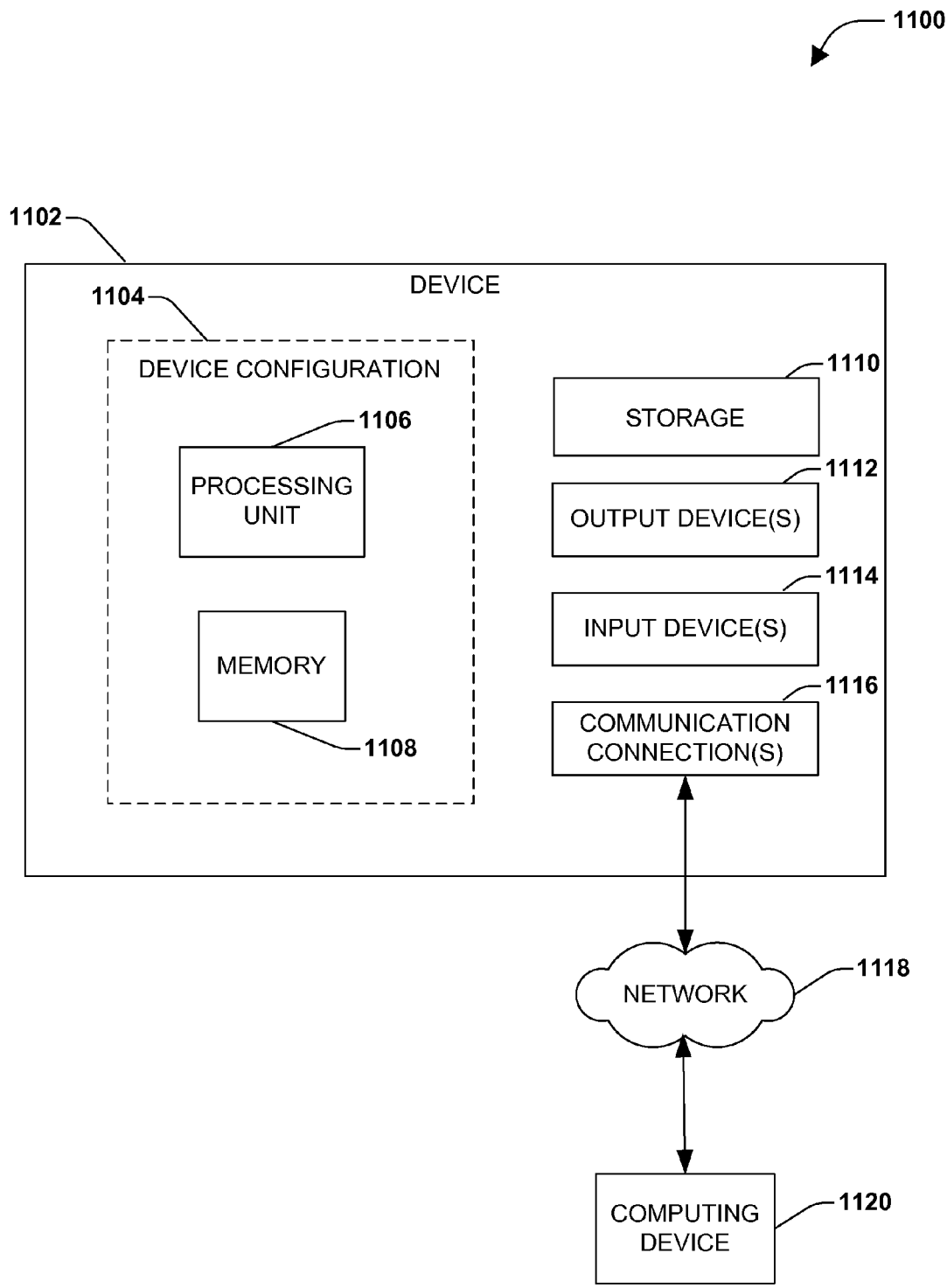
FIG. 11 is an illustration of an exemplary computing environment wherein a portion of the present techniques may be implemented and/or utilized.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other embodiments, device 1102 may include additional features and/or functionality. For example, device 1102 may also include additional storage (e.g., removable and/or non-removable) including, but not limited to, magnetic storage, optical storage, and the like. Such additional storage is illustrated in FIG. 11 by storage 1110. In one embodiment, computer readable instructions to implement one or more embodiments provided herein may be in storage 1110. Storage 1110 may also store other computer readable instructions to implement an operating system, an application program, and the like. Computer readable instructions may be loaded in memory 1108 for execution by processing unit 1106, for example.

The term "computer readable media" as used herein includes computer storage media. Computer storage media includes volatile and nonvolatile, removable and non-removable media implemented in any method or technology for storage of information such as computer readable instructions or other data. Memory 1108 and storage 1110 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1102. Any such computer storage media may be part of device 1102.

Device 1102 may also include communication connection(s) 1116 that allows device 1102 to communicate with other devices. Communication connection(s) 1116 may include, but is not limited to, a modem, a Network Interface Card (NIC), an integrated network interface, a radio frequency transmitter/receiver, an infrared port, a USB connection, or other interfaces for connecting computing device 1102 to other computing devices. Communication connection(s) 1116 may include a wired connection or a wireless connection. Communication connection(s) 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 1114 such as keyboard, mouse, pen, voice input device, touch input device, infrared cameras, video input devices, and/or any other input device. Output device(s) 1112 such as one or more displays, speakers, printers, and/or any other output device may also be included in device 1102. Input device(s) 1114 and output device(s) 1112 may be connected to device 1102 via a wired connection, wireless connection, or any combination thereof. In one embodiment, an input device or an output device from another computing device may be used as input device(s) 1114 or output device(s) 1112 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 1120 accessible via network 1118 may store computer readable instructions to implement one or more embodiments provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

F. Use of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of performing an action associated with a gesture performed by a user of a device having a processor and a sensor providing a sensor output, the method comprising:
    executing on the processor instructions that cause the device to:
        transition the device to a training mode upon receiving, from the user, a training start, request;
        during the training mode:
            while the user performs the gesture, monitor the sensor to detect an identified sensor output identifying the gesture during a training period between the training start request and the training completion request;
            identify, during the training period, a restricted period that is shorter than the training period and during which the identified sensor output identifies the gesture;
            associate with the gesture the identified sensor output of the sensor during the restricted period; and
            associate an action with the gesture;
        transition the device to a recognition mode upon receiving, from the user, a training completion request; and
        during the recognition mode:
            monitor the sensor output of the sensor; and
            upon detecting that the sensor output matches the identified sensor output associated with the gesture, perform the action associated with the gesture.

2. The method of claim 1, wherein executing the instructions on the processor further causes the device to, upon detecting an addition to the device of an added sensor, transition the device to the training mode to detect the identified sensor output of the added sensor while the user performs the gesture.

3. The method of claim 1, wherein executing the instructions on the processor further causes the device to, upon detecting a gesture that is not associated with an identified sensor output of a sensor within a recognition confidence threshold, transition the device to the training mode to retrain the sensor to recognize the gesture.

4. The method of claim 1, wherein executing the instructions on the processor further causes the device to, upon detecting a miscalibration of a sensor that reduces a recognition accuracy of the identified sensor output associated with the gesture, transition the device to the training mode to retrain the sensor to recognize the gesture.

5. The method of claim 1, wherein executing the instructions on the processor further causes the device to, upon receiving a gesture profile specifying a selected gesture that is associated with an identified sensor output that is not compatible with the sensor of the device, transition the device to the training mode to train the sensor to recognize the gesture.

6. The method of claim 1, wherein executing the instructions on the processor further causes the device to, upon detecting a sensor output of the sensor identifying a detected gesture that is not associated with an action, request the user to associate the detected gesture with at least one action.

7. The method of claim 1, wherein monitoring the sensor to detect the identified sensor output further comprises:
    during respective at least two gesture performances of the gesture by the user, monitoring the sensor to detect the identified sensor output identifying the gesture during the gesture performance; and determining the identified sensor output according to the identified sensor outputs of the respective at least two gesture performances.

8. The method of claim 7, wherein determining the identified sensor output further comprises:
 comparing the identified sensor outputs during the respective at least two gesture performances to determine a recognition confidence;
 while the recognition confidence is above a recognition confidence threshold, instructing the user to repeat the gesture performance; and
 upon determining the recognition confidence within the recognition confidence threshold, associating the identified sensor output with the gesture.

9. The method of claim 1, wherein the association between the identified sensor output and the gesture is stored in a gesture profile, the method further comprising executing on the processor instructions that cause the device to send the gesture profile to a gesture profile service.

10. The method of claim 1, further comprising executing on the processor instructions that cause the device to retrieve a gesture profile from a gesture profile service, the gesture profile comprising an association of a gesture with an identified sensor output of at least one sensor and an action.

11. The method of claim 10, further comprising executing on the processor instructions that cause the device to transition the device to the training mode in response to detecting that the gesture profile's identified sensor output of the at least one sensor comprises two or more sensor outputs of two or more sensors, at least one of which is absent from the device.

12. The method of claim 10, further comprising executing on the processor instructions that cause the device to:
 detect that the gesture profile's identified sensor output of the at least one sensor comprises two or more sensor outputs of two or more sensors, at least one of which is absent from the device; and
 translate the at least one sensor output of the at least one sensor that is absent from the device into translated sensor output of the sensor that is part of the device.

13. A device that performs actions associated with gestures performed by a user, the device comprising:
 a memory;
 at least two sensors providing at least two sensor outputs;
 a gesture trainer that:
  while the user performs the gesture, monitors the at least two sensors to detect one or more identified sensor outputs identifying the gesture, the detecting the one or more identified sensor output comprises:
   identifying, at least one recognizing sensor providing an identified sensor output identifying the gesture; and
   identifying at least one non-recognizing sensor that does not provide an identified sensor output identifying the gesture; and
  stores in the memory the one or more identified sensor outputs that together identify the gesture, the storing excluding, the identified sensor output of the at least one non-recognizing sensor;
 an action associator that, upon receiving from the user an action to be associated with the gesture, stores in the memory an association of the action with the gesture; and
 a gesture recognizer that:
  monitors the at least two sensor outputs of the at least two sensors to detect the one or more identified sensor outputs identifying the gesture; and
  performs the action associated in the memory with the gesture associated with the one or more identified sensor outputs.

14. The device of claim 13, wherein:
 detecting the identified sensor output identifying the gesture further comprises:
  requesting the user to identify, among the at least two sensors, at least one selected sensor identifying the gesture;
  while the user performs the gesture, monitoring only the at least one selected sensor to detect an identified sensor output identifying the gesture; and
 storing the one or more identified sensor outputs in the memory further comprises: storing in the memory the identified sensor outputs only of the respective at least one selected sensor.

15. The device of claim 14, wherein:
 the respective devices are associated with at least one sensor modality;
 requesting the user to identify the at least one selected sensor further comprises:
  requesting the user to identify, among at least two sensor modalities respectively associated with at least one sensor of the device, at least one selected sensor modality identifying the gesture;
  detecting the identified sensor output further comprises: while the user performs the gesture, monitoring only the at least one sensor associated with at least one selected sensor modality to detect an identified sensor output identifying the gesture; and
  storing the identified sensor output in the memory further comprises: storing in the memory the identified sensor outputs only of the at least sensor associated with at least one selected sensor modality.

16. A tangible computer-readable memory device storing instructions that, when executed on a processor of a computing device having a sensor, cause the computing device to perform actions associated with gestures performed by a user, by:
 transitioning to a training mode upon receiving. from the user, a training start request;
 during the training mode:
  while the user performs the gesture, monitoring the sensor to detect an identified sensor output identifying the gesture during a training period between the training start request and the training completion request;
  identifying, during the training, period, a restricted period that is shorter than the training period and during which the identified sensor output identifies the gesture;
  associating with the gesture the identified sensor output of the sensor during the restricted period; and
  associating an action with the gesture;
 transitioning to a recognition mode upon receiving, from the user, a training completion request; and
 during the recognition mode:
  monitoring the sensor output of the sensor; and
  upon detecting that the sensor output matches the identified sensor output associated with the gesture, performing the action associated with the gesture.

17. The tangible computer-readable memory device of claim 16, wherein executing the instructions on the processor further causes the computing device to:

store an association of the gesture with the action and the identified sensor output of the sensor in a gesture profile; and send the gesture profile to a gesture profile service.

18. The tangible computer-readable memory device of claim 16, wherein executing the instructions on the processor further causes the computing device to retrieve a gesture profile from a gesture profile service, the gesture profile comprising at least one association of a gesture with an identified sensor output of a sensor and an action.

19. The tangible computer-readable memory device of claim 16, wherein:

the action is further associated with a device context of the computing device; and performing the action further comprises: upon detecting that the sensor output matches the identified sensor output associated with the gesture while a current device context of the computing device matches the device context associated with the action, performing the action associated with the gesture.

20. The tangible computer-readable memory device of claim 16, wherein:

the computing device comprises at least two sensors;

the action is further associated with the sensor providing the identified sensor output that is associated with the gesture; and performing the action further comprises: upon detecting that the sensor output matches the identified sensor output associated with the gesture, performing the action associated with the gesture and with the sensor providing the sensor output.

* * * * *